United States Patent [19]

Lee et al.

[11] Patent Number: 4,685,058

[45] Date of Patent: Aug. 4, 1987

[54] TWO-STAGE PIPELINED EXECUTION UNIT AND CONTROL STORES

[75] Inventors: Hsiao-Peng S. Lee; Stephen J. Rawlinson, both of Sunnyvale; Stephen S. Si, Milpitas, all of Calif.

[73] Assignee: Amdahl Corporation, Sunnyvale, Calif.

[21] Appl. No.: 898,741

[22] Filed: Aug. 15, 1986

Related U.S. Application Data

[63] Continuation of Ser. No. 528,161, Aug. 29, 1983, abandoned.

[51] Int. Cl.⁴ .............................................. G06F 9/28
[52] U.S. Cl. ................................................... 364/200
[58] Field of Search ... 364/200 MS File, 900 MS File, 364/300 MS File

[56] References Cited

U.S. PATENT DOCUMENTS

| | | | |
|---|---|---|---|
| 3,839,705 | 10/1974 | Davis et al. | 364/200 |
| 3,840,861 | 10/1974 | Amdahl et al. | 364/200 |
| 4,008,462 | 2/1977 | Kanda | 364/200 |
| 4,075,687 | 2/1978 | Nissen | 364/200 |
| 4,080,648 | 3/1978 | Asano et al. | 364/200 |
| 4,179,736 | 12/1979 | Wilhite | 364/200 |
| 4,251,862 | 2/1981 | Murayama | 364/200 |
| 4,325,121 | 4/1982 | Gunter et al. | 364/200 |
| 4,390,946 | 6/1983 | Lane | 364/200 |
| 4,459,666 | 7/1984 | Kruger | 364/200 |
| 4,586,127 | 4/1986 | Horvath | 364/200 |

Primary Examiner—Archie E. Williams, Jr.
Assistant Examiner—Florin Munteanu
Attorney, Agent, or Firm—Fliesler, Dubb, Meyer & Lovejoy

[57] ABSTRACT

A two control store scheme with instruction execution overlay is shown in a data processing system execution unit having a two-state pipeline. The first control store controls the first-stage facilities during the first cycle of instruction execution and points to the initial location of the second control store. The second control store controls the second-state facilities during the final cycle of instruction execution. The second control store also controls the facilities of both stages during the intermeidate cycles of instruction requiring more than two cycles to execute. Because the second control store controls only the second-stage facilities during the final cycle, execution of the first cycle of the following instruction can take place concurrently within the first-stage facilities under the control of the first control store.

5 Claims, 3 Drawing Figures

FIG.—1

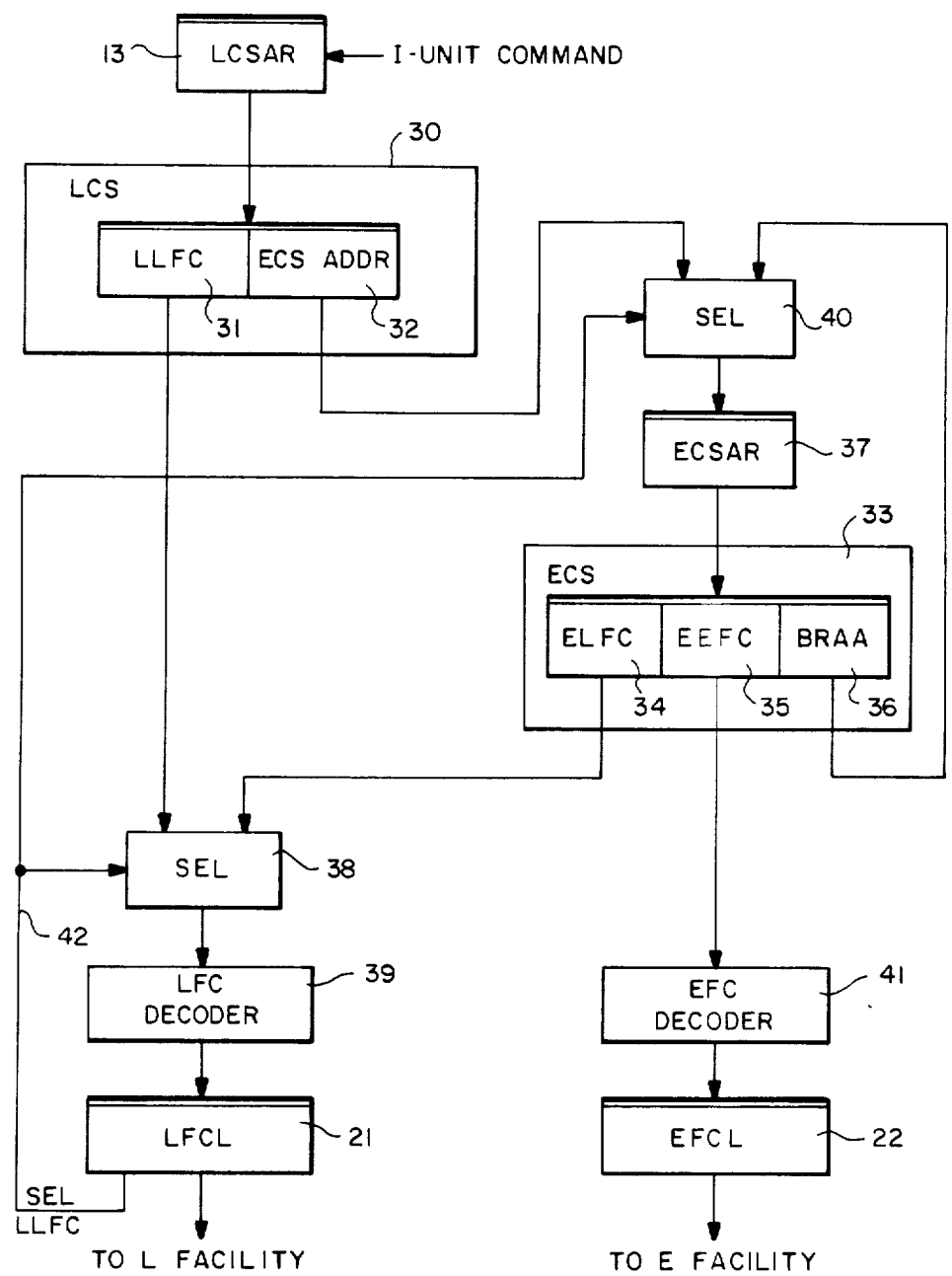
FIG. — 3

TWO-STAGE PIPELINED EXECUTION UNIT AND CONTROL STORES

This application is a continuation of application Ser. No. 528,161 filed Aug. 29, 1983, now abandoned.

BACKGROUND OF THE INVENTION

The present invention relates to control apparatus for use in a high-performance, pipelined data processing system.

Pipelining is a technique used in data processing systems to enhance performance. In pipelining, the processing of a new instruction commences before the processing of the previous instruction is completed. Pipelining processes each instruction in several stages. Each stage performs a different function, such as instruction fetch, instruction decode, operand address generation, operand fetch, operand checking, execution and operand storing. In the pipeline, the instructions are offset by one or more stages. After one instruction has been processed in the first stage, it is processed in second, third, fourth and subsequent stages.

When the first instruction is being processed by the second stage, a second instruction can be processed in the first stage. When the first instruction goes to the third stage, the second instruction goes to the second stage and a third instruction is introduced into the first stage. The concurrent processing of instructions in a pipeline is well known in data processing systems. For example, see U.S. Pat. No. 3,840,861 entitled DATA PROCESSING SYSTEM HAVING AN INSTRUCTION PIPELINE FOR CONCURRENTLY PROCESSING A PLURALITY OF INSTRUCTIONS and assigned to the assignee of the present invention.

Each stage of the pipeline requires control logic for controlling the functions that are to be performed by that stage. Control logic can be either hard-wired or microprogrammed as described, for example, in the co-pending application entitled FLEXIBLE HARD-WIRED DECODER (AMDH 3916 DEL) assigned to the assignee of the present invention.

In data processing systems, the system is frequently organized into various units which perform different functions. For example, one system has an execution unit (E-Unit), an instruction unit (I-Unit), a storage unit (S-Unit), a memory bus controller unit (MBC-Unit), a high-speed buffer unit (HSB-Unit), and other units. Each of these different units performs different functions which are separately controlled. Together all of the units operate to execute instructions where each unit performs some function in connection with instructions. Each of the units has control apparatus which controls the functions performed by that unit. When the control apparatus is microprogrammed, the control executes microinstructions to control the functions. Microprogrammed control apparatus has been used in data processing systems for many years. Microprogrammed control provides great flexibility since changes in control can be made merely by changing microinstructions stored in the control store. When microprogrammed control apparatus is employed in high-performance systems, the speed with which microinstructions can be executed is slower than desired.

One technique for speeding the operation of microprogrammed control apparatus is described in the co-pending application entitled, MULTIPLE MODULE CONTROL STORE FOR USE IN A DATA PROCESSING SYSTEM, Ser. No. 184,126, filed on Sept. 4, 1980, and assigned to the assignee of the present invention. In that application, two or more parallel control stores operate concurrently to speed up branching and other operations during the execution of sequences of microinstructions.

The enhancement of the execution of instructions in the microprogrammed control apparatus is important. There is a need for even further enhancement of microprogrammed controllers, particularly ones which are optimized for controlling stages in a pipelined system.

SUMMARY OF THE INVENTION

The present invention is a microprogrammed control apparatus of an execution unit in a pipeline instruction processor.

In one system using the present invention, the execution unit has a 2-stage instruction pipeline. While the current instruction is in the first stage, the previous instruction is in the second stage. When the current instruction advances to the second stage, the next instruction can enter the first stage.

In order to achieve flexibility and to reduce the amount of control logic, the execution unit is controlled by microprograms. The execution of each instruction is under control of a different microprogram. When instruction execution overlap, two separate microprograms execute concurrently. In the present invention, the concurrent execution uses two control stores and logic to select control signals from the two control stores.

The microprograms control the execution of many distinct instructions. In one example, a data processing system can have 256 different instructions defined in its architecture. Since the final cycle of each instruction can overlap the first cycle of any other instruction, as many as 65,280 different combinations of overlap can be encountered. Because only one microword at a time can be read from a typical control store, using a single control store to control the execution unit would require as many as 65,280 locations just to handle the overlapping situations.

The use of two control stores reduces the control store word count and simplifies the writing of microprograms. One control store contains that part of microprograms controlling the first stage of execution for all instructions, and the other control store contains that part of microprograms controlling the second stage of execution for all instructions. With this arrangement, microprograms are written for each instruction without any adverse impact from microprograms for other instructions, even though there is overlap of instruction execution.

The combined program sequence from two control stores operates efficiently for controlling two different instruction functions concurrently. Accordingly, the present invention provides an improved control apparatus for use in pipeline execution of more than one instruction.

The foregoing and other objects, features and advantages of the invention will be apparent from the following detailed description set forth in conjunction with the accompanying drawings.

BRIEF DESCRIPTION OF THE DRAWINGS

FIG. 3 depicts a block diagram of the two control store apparatus which forms part of the control apparatus within the execution unit of FIG. 2.

DESCRIPTION OF THE PREFERRED EMBODIMENT

Figure 1:
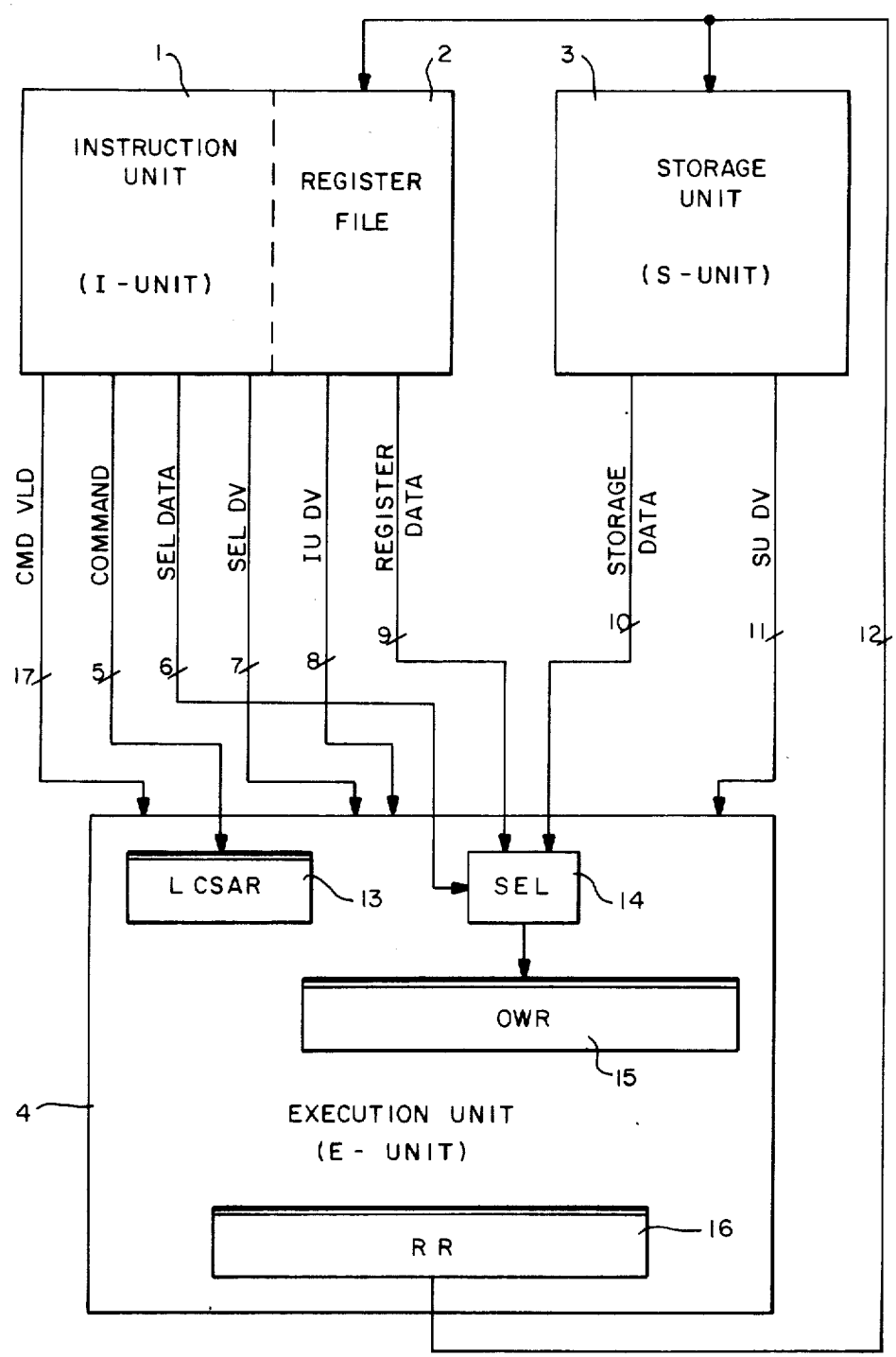
FIG. 1 depicts a block diagram of the data processing system which uses the control apparatus of the present invention.

Overall System—FIG. 1

FIG. 1 shows a block diagram of a data processing system which utilizes the present invention. The data processing system includes a number of functional units, including an instruction unit (I-unit) 1 having a register file 2, a storage unit (S-unit) 3, and an execution unit (E-unit) 4.

In one embodiment, the register file 2 is contained within the I-unit, but any location of the register file can be used. The E-unit 4 receives a command from the I-unit 1 on bus 5 indicating what execution is required for the current instruction. This command is stored in LCSAR register 13. The presence of this command on bus 5 is indicated by the CMD VLD line 17. Data is fetched from the register file 2 onto bus 9 and/or from the storage unit 3 onto bus 10. Selector 14 selects the data into OWR register 15 according to a signal on the select data lines 6 from the I-unit. The result of the execution is placed in RR register 16 and then sent to the register file 2 or the storage unit 3 via bus 12.

The RR register 16 content is sent externally to the register file 2 and the storage unit 3, and sent internally to within the E-Unit 4. Because of the dual use, register RR 16 has special controls which will be described later in detail.

In the event that data to OWR register 15 is delayed, the E-Unit 4 needs to inhibit the clocking of its registers until the data arrives. At the time of data arrival, a signal indicating that the data is valid becomes active. For register data, this signal is IU DV and comes across line 8. For storage data, this signal is SU DV and comes across line 11. The I-unit 1 sends a signal, SEL DV, across line 7 indicating whether the E-unit should test line 8 or line 11.

Pipeline Description

The execution unit 4, which uses the present invention, occupies two pipeline stages. One preferred embodiment of the data processing system has the five pipeline stages G, B, L, E and W defined as follows:

G. The G stage sends a command from I-unit 1 to LCSAR 13 and selects the data to be fetched from register file 2 and storage unit 3.

B. The B stage loads data into OWR 15.

L. The L stage is the first of the two execution stages. This stage handles initial execution of the instruction.

E. The E stage is the second of the two execution stages. This stage loads the result of the execution into RR 16.

W. The W stage writes the result from RR 16 into register file 2 or storage unit 3.

Except for the E stage, an instruction stays in each stage for only one cycle, but that one cycle can be repeated by interlocks resulting from data missing or delayed operation of prior instructions. The E stage has one or more cycles depending upon the complexity of the execution of the current instruction. Increased performance is achieved by overlapping stages of consecutive instructions. CHART 1 illustrates an example of instruction overlap in an instruction pipeline.

CHART 1

| I | Cycle |   |   |   |   |   |   |   |   |    |    |    |    |    |    |    |    |    |    |    |
|---|---|---|---|---|---|---|---|---|---|---|---|---|---|---|---|---|---|---|---|---|
|   | 1 | 2 | 3 | 4 | 5 | 6 | 7 | 8 | 9 | 10 | 11 | 12 | 13 | 14 | 15 | 16 | 17 | 18 | 19 | 20 |
| 1 | G | B | L | E | W |   |   |   |   |    |    |    |    |    |    |    |    |    |    |    |
| 2 |   | G | B | L | E | W |   |   |   |    |    |    |    |    |    |    |    |    |    |    |
| 3 |   | . | G | B | L | E | E | E | W |    |    |    |    |    |    |    |    |    |    |    |
| 4 |   |   |   | G | B | B | B | L | E | W  |    |    |    |    |    |    |    |    |    |    |
| 5 |   |   |   |   | G | G | G | B | L | E  | W  |    |    |    |    |    |    |    |    |    |
| 6 |   |   |   |   |   |   | G | B | L | E  | W  |    |    |    |    |    |    |    |    |    |
| 7 |   |   |   |   |   |   |   | G | B | L  | L  | E  | W  |    |    |    |    |    |    |    |
| 8 |   |   |   |   |   |   |   |   | G | B  | B  | L  | E  | W  |    |    |    |    |    |    |
| 9 |   |   |   |   |   |   |   |   |   | G  | G  | B  | L  | E  | W  |    |    |    |    |    |

Instruction 1 is in the G stage in Cycle 1, the B stage in Cycle 2, the L stage in Cycle 3, the E stage in Cycle 4, and the W stage in Cycle 5. Instruction 2 is in each of its stages one cycle later than instruction 1. Because instruction 3 stays in the E stage for three cycles, the L stage of instruction 4, the B stage of instruction 5, and the G stage of instruction 6 are delayed. Because instruction 7 experiences a one cycle delay before data becomes valid, the L stage of instruction 7, the B stage of instruction 8, and the G stage of instruction 9 are repeated by one cycle.

The present invention controls the operation of the E-unit 4 during the L stage (one cycle) and the E stage (one or more cycles) of each instruction.

Figure 2:
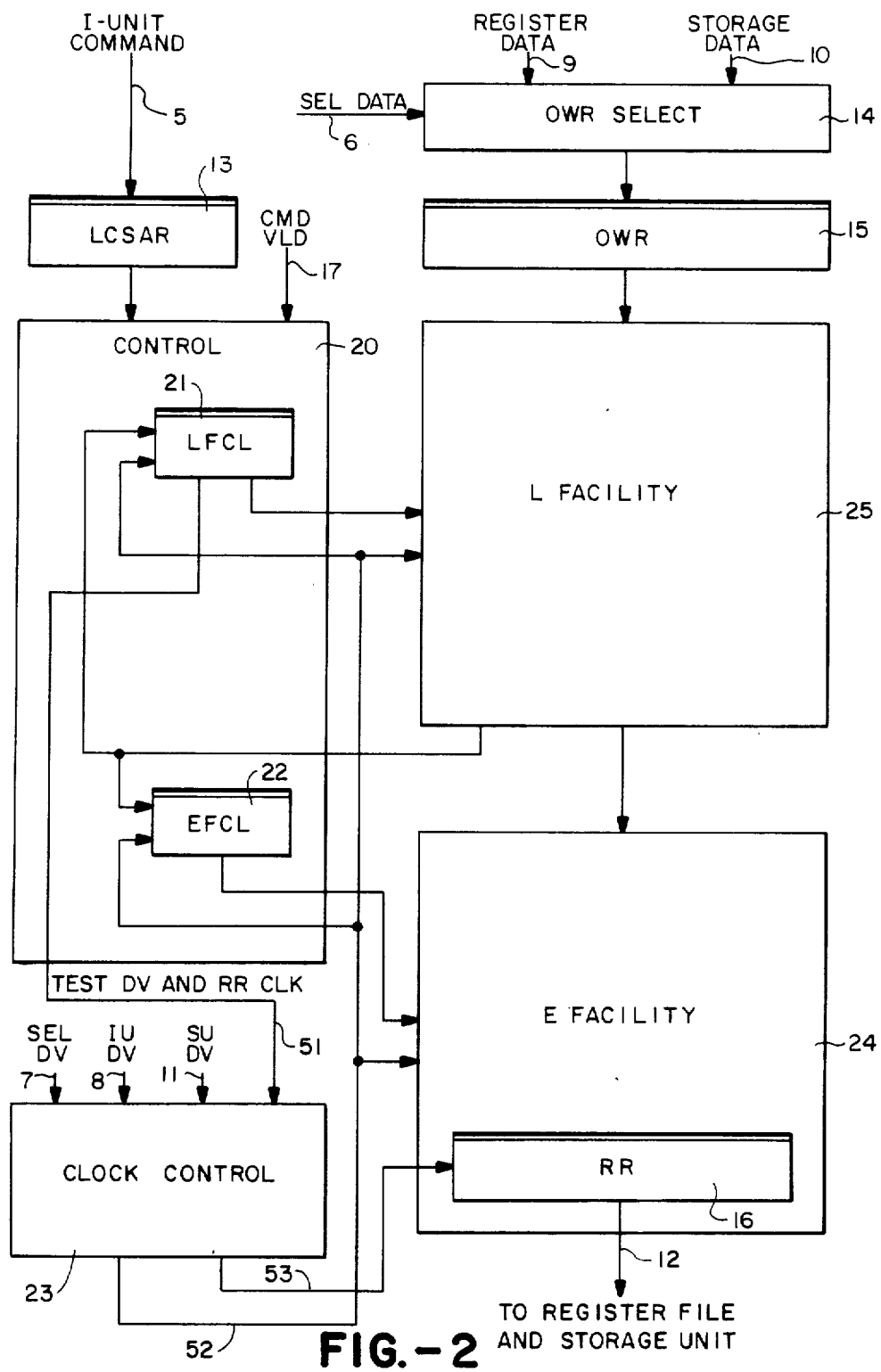
FIG. 2 depicts a block diagram of the execution unit of FIG. 1 which uses the control apparatus of the present invention.

Execution Unit—FIG. 2

FIG. 2 shows the various components of the E-unit 4. Selector 14, under the control of the SEL DATA line 6, selects data into the operand word register (OWR) 15 from the register data bus 9 or the storage data bus 10. The L facility 25 receives the data from the OWR register 15 and performs logical and checking functions. After such functions are performed, the E facility 24 performs additional functions, such as adds, multiplies, and divides, and produces a result in the result register (RR) 16. The result is returned on bus 12 to the storage unit 3 or the register file 2 of FIG. 1.

An instruction uses only the L facility for its L stage execution. It uses both the L facility and the E facility for all cycles (except the last cycle) of the E stage execution. Only the E facility is used in the last cycle of the E stage execution, thus allowing the overlapping of this cycle with the L stage of the next instruction.

Further details of the L facility 25 and the E facility 24 are described in the above identified application entitled MULTIPLE MODULE CONTROL STORE FOR USE IN A DATA PROCESSING SYSTEM.

In FIG. 2, the control 20 receives the command from the LCSAR register 13 and issues control signals to the L facility 25 and E facility 24. The control signals to the L facility 25 are stored in the L facility control latch (LFCL) 21. The control signals to the E facility 24 is stored in the E facility control latch (EFCL) 22.

In FIG. 2, the clock control 23 receives the SEL DV control line 7, the IU DV control line 8, the SU DV control line 11, and the TEST DV and RR CLOCK line 51. Control 23 uses these signals to control the clock signals on line 52 to the L facility 25, the E facility 24, EFCL 22, and LFCL 21 and the clock signal on line 53 to RR register 16.

The components in FIG. 2 are exercised in various pipeline stages as follows.

At the end of the G stage, LCSAR 13 receives the I-unit command.

During the B stage, the control 20 examines the contents of LCSAR 13 to determine what to load into LFCL 21. OWR 15 is loaded with data from OWR Select 14 at the end of the B stage.

During the L stage, L facility 25 operates on data from OWR 15 under the control of LFCL 21. EFCL 22 is loaded in a manner to be discussed later. If data is not valid, clock control 23 prevents all registers (except LCSAR 13, OWR 15, and sometimes RR 16) from being clocked so that the L stage may be repeated in the following cycle. If the current instruction has one E cycle, then LFCL 21 is loaded as part of the B stage operation of the next instruction. If the current instruction has more than one E cycle, then LFCL 21 is loaded in a manner to be described later.

During all but the last cycle of the E stage (for instructions with a single cycle E stage, that cycle is the last cycle) the L facility 25 operates under control of LFCL 21, and E facility 24 operates under control of EFCL 22. Interlock will inhibit clocking of all registers because no other instruction is currently in the L stage. In the next to last cycle of the E stage, LFCL 21 is loaded as part of the B stage operation of the next instruction. Prior to the next to last cycle of the E stage, LFCL 21 is loaded in a manner to be described later. EFCL 22 is loaded in a manner to be described later.

During the final cycle of the E stage, E facility operates under control of EFCL 22. If the next instruction is in the L stage, then the L facility operates as the L stage of that instruction; otherwise the L facility is idle as controlled by the LFCL.

During the W stage, data from RR register 16 is sent to the register file 2 or the storage unit 3.

Control Mechanism—FIG. 3

The control 20 of FIG. 2 for the E-unit 4 is a microprogrammed control with two control stores. As shown in FIG. 3, the two control stores are the L Control Store (LCS) 30 and the E Control Store (ECS) 33. The microprogram for each instruction is broken into two parts. The first part controls the instruction when it is in the L stage, and is stored in LCS 30. The second part controls the instruction when it is in the E stage of the instruction, and is stored in ECS 33. LCS 30 and ECS 33 can be read at the same time for different instructions and thus allow for independent control of the L and E stages of two different instructions. The microwords in LCS 30 require no branching capability because each instruction uses only one microword. The microwords in ECS 33 do branch, and a two module fast branching mechanism is provided. Further details of this mechanism are described in the application entitled, MULTIPLE MODULE CONTROL STORE FOR USE IN A DATA PROCESSING SYSTEM, Ser. No. 184,126, filed on Sept. 4, 1980, now abandoned and assigned to the assignee of the present invention.

LCSAR register 13 is loaded at the end of the G stage with the I-Unit command. The contents of register 13 address the desired word in LCS 30 which is read during the B stage. The data in each LCS word is divided into two parts, LLFC 31 and ECS ADDR 32. The data in LLFC 31 goes to selector 38 and then to LFC decoder 39 and finally latched in LFCL 21. The data in ECS ADDR 32 goes to selector 40 and then latched in ECSAR 37.

During the L stage, the data in LFCL 21 controls the L facility. The word in ECS 33 addressed by ECSAR 37 is also read. The data in each ECS word is divided into three parts, ELFC 34, EEFC 35, and BRAA 36. The data in ELFC 34 goes to selector 38. The selector 38 selects between LLFC 31 and ELFC 34 and sends the selected data to LFC decoder 39 and then latched in LFCL 21. Meanwhile, the data in EEFC 35 goes to EFC decoder 41 and then latched in EFCL 22. The data in BRAA 36 goes to selector 40 and then latched in ECSAR 37.

Operation during the E stage is like that of the L stage except that the selectors 38 and 40 behave differently. Discussion of this difference is provided later.

The LFC decoder 39 and the EFC decoder 41 provide for expansion of a small number of control bits from the microstores into a much larger number of control bits required by the L and E facilities. Decoders are well-known, and any convenient decoder may be employed.

Idle Loop

Some instructions examined by the I-unit 1 require no action by the E-unit 4. The I-unit indicates these instructions via the CMD VLD line 17. Since no address is loaded into LCSAR 13 in these cases, the E-unit 4 continues to receive controls for both the L and E facilities from ECS 33. The words read out during this time form an idle loop. The controls in these words specify that no actions be taken other than to be alert for a new instruction.

During the final cycle of the E stage of each instruction, BRAA 36 points to the idle loop.

Selecting into LFCL and ECSAR

The two stages of the E-unit pipeline can be occupied by two instructions. Since only the last E cycle of a instruction can overlap with the L cycle of the following instruction, an interlock mechanism is used for synchronizing the two instructions. One bit in the LFCL 21 is defined to accomplish such synchronization. This bit is the SEL LLFC control bit, which travels across line 42 to selectors 38 and 40. This bit, when not active, allows an instruction that has multiple E cycles to continue to execute those E cycles without the next instruction displacing it.

When the SEL LLFC bit is off, ELFC 34 is selected by selector 38 into LFC decoder 39, and BRAA 36 is selected by selector 40 into ECSAR 37. The following cycle will be dedicated to the execution of the current instruction (in the E cycle). When the SEL LLFC bit is on and CMD VLD 17 is active, LLFC 31 is selected by selector 38 into LFC decoder 39, and ECS ADDR 32 is selected by selector 40 into ECSAR 37. The following cycle overlaps the execution of the last E cycle of the current instruction and the L cycle of the next instruction. When the SEL LLFC bit is on, but CMD VLD 17 is inactive, ELFC 34 is selected by selector 38 into LFC decoder 39, and BRAA 36 is selected by selector 40 into ECSAR 37. The following cycle executes the last E cycle of the current instruction with no instruction in the L stage. The ELFC 34 in the last microword of the instruction specifies that the L facility is not to be used except to be alert for a new instruction, and the BRAA 36 in that microword points to the idle loop. The following rules govern the setting of the SEL LLFC bit:

For a single E cycle instruction, both the L cycle and E cycle specify SEL LLFC.

For a multiple E cycle instruction, only the last two E cycles specify SEL LLFC.

SEL LLFC is specified if no instruction is in the E-unit pipeline. In particular, SEL LLFC is specified in the idle loop.

DATA VALID Control

Certain cycles of the E-Unit microprogram receive data from either the register file 2 or the S-unit 3. Data arrival is indicated by the DATA VALID (DV) signals 8 and 11 from the I-unit 1 and S-unit 3. The particular cycle must wait for the DATA VALID signal before it can finish the current cycle execution and advance to the next cycle. Whether a cycle is dependent upon the DATA VALID signal or not is specified by the TEST DATA VALID bit in LFCL 21.

Clocking RR

Normally, if a cycle receives data from either the I-unit or S-unit, the E-unit clock is stopped if the appropriate DATA VALID signal is not received by the end of cycle. However, since it is possible to have two instructions in the two E-unit pipeline stages, it is necessary to allow the completion of the instruction in the E stage even when data is not available for the instruction in the L stage. It is possible that the E stage is loading data into RR 16 to be stored into the S-unit 3. That same data must then be read from the S-unit to be used in the L stage of the next instruction. DATA VALID would not become true until the data became available for use in the L stage of the next instruction, but that data would not be made available for such use until it has been clocked into the RR 16 and then stored into the S-unit. In such a situation the RR 16 has to be clocked while the other registers in the E-unit are held in order to keep the E-unit from becoming deadlocked waiting for DATA VALID.

The clocking of RR register register 16 depends on the control signal RR CLOCK from LFCL 21.

If RR CLOCK is not specified and data is not valid, no registers will be clocked.

If RR CLOCK is specified and data is not valid, no registers except RR register 16 will be clocked. RR register will receive only one more clock than the rest of the unit. After a DV signal is received by the E-Unit, the first clock will be seen by all registers except RR register, so that RR register can get back into synchronization with the rest of the E-unit.

Since a DATA VALID dependent cycle will be repeated for as long as the interlock is on, RR register 16 must be used with care if RR CLOCK is specified. In this situation, the microcoder must not load any E-Unit register from RR register because the contents taken from the RR register are not predictable.

An example of two microprograms which utilize the two control stores is given in the following TABLE 1.

TABLE 1

```
                                                                           PAGE 1
                          /* LNR -- 11 */                          */      2
/* LOAD NEGATIVE                                                    */     3
/*                                                                  */     4
/* MNEMONIC: LNR                                                    */     5
/* OP CODE: 11                                                      */     6
/* FORMAT: RR                                                       */     7
/* OPERATION: THE TWO'S COMPLEMENT OF THE ABSOLUTE VALUE OF THE     */     8
/*   SECOND OPERAND IS PLACED IN THE FIRST OPERAND LOCATION.        */     9
/*   THE OPERATION COMPLEMENTS POSITIVE NUMBERS; NEGATIVE NUMBERS   */    10
/*   REMAIN UNCHANGED. THE NUMBER ZERO REMAINS UNCHANGED WITH       */    11
/*   POSITIVE SIGN.                                                 */    12
/*                                                                  */    13
/* CONDITION CODE:    0 -- RESULT IS ZERO                           */    14
/*                    1 -- RESULT IS LESS THAN ZERO                 */    15
/*                                                                  */    16
/* FLOW:                                                            */    17
/*                       (NEGATIVE OPERAND)                         */    18
/*         START → S1 → S2 → → → → → → → → → → S3 → EXIT            */    19
/*                      |                                           */    20
/* POSITIVE OPERAND)    |                                           */    21
/*                      |                                           */    22
/*                    NULL → EXIT                                   */    23
/*                                                                  */    24
/* PIPELINE SEQUENCE:                                               */    25
/*                                                                  */    26
/*     G B L E E W                                                  */    27
/*                                                                  */    28
/* CONTROL-STORE REQUIREMENT:        ECSA = 0                       */    29
/*                                   ECSB = 2                       */    30
/*                                   ────────                       */    31
/*                                   TOTAL ECS = 2                  */    32
/*                                                                  */    33
/* TIMING: 2 CYCLES                                                 */    34
/*                                                                  */    35
                                                                       Page 2
                          /* LNR -- 11 */                                37
```

TABLE 1-continued

```
BEGIN LNR;                                                              38
                                                                        39
CSECT LCS;                                                              40
                                                                        41
ORIGIN '11'X;                                                           42
                                                                        43
EULNR:    $1:                                                           44
          OWRH → OWRSELH,                                               45
          OWRSELH → LUCKH,                                              46
          LUCKH → AR,                                                   47
          1 → TEST_DATA_VALID,                                          48
          IF LUCKH=0 THEN 1 ELSE 0 ENDF → ZERO_TRIGGER,                 49
          LUCKH_SIGN → SIGN1_TRIGGER,                                   50
          ECSB → CONTROL_STORE,                                         51
          $2B → ECS_ADDR;                                               52
                                                                        53
CSECT ECSB;                                                             54
                                                                        55
$2B:      0 → CPA1,                                                     56
          (AR_INV/(0..31), 0/(32..63)) → CPA2,                          57
          0 → CPA3,                                                     58
          HOT_CARRY_31 → ADDER_CARRY_IN,                                59
          CPA → RR,                                                     60
          ZERO_TRIGGER → CC0_TRIGGER,                                   61
              ZERO_TRIGGER → CC1_TRIGGER,                               62
          0 → CC3_TRIGGER,                                              63
          EARLY_NOTICE → I_UNIT,                                        64
          LLFC → LFCL,                                                  65
              SIGN1_TRIGGER → BRANCH,                                   66
          EXIT_LOOP_A → BRANCH_ADDRESS;                                 67
                                                                        68
$3B:      0 → CPA1,                                                     69
          0 → CPA2,                                                     70
          RR_INV → CPA3,                                                71
          HOT_CARRY_63 → ADDER_CARRY_IN,                                72
          CPA → RR,                                                     73
          LLFC → LFCL,                                                  74
          1 → BRANCH,                                                   75
          EXIT_LOOP_A → BRANCH_ADDRESS;                                 76
                                                                        77
ENDB LNR;                                                               78
```

Page 3

```
                    /* AR, A -- 5A */                                      80
/*   ADD                                                          */    81
/*                                                                */    82
/*   MNEMONICS: AR, A     (SEE ALSO 'AH' AT ADDRESS 4A)           */    83
/*                                                                */    84
/*   OPCODE: 1A, 5A                                               */    85
/*                                                                */    86
/*   OPERATION: THE SECOND OPERAND IS ADDED TO THE FIRST OPERLAND, AND */ 87
/*      THE SUM IS PLACED IN THE FIRST-OPERLAND LOCATION.         */    88
/*      BOTH OPERANDS ARE 32 BITS.                                */    89
/*                                                                */    90
/*   CONDITION CODE:   0 --- SUM IS ZERO                          */    91
/*                     1 --- SUM IS LESS THAN ZERO                */    92
/*                     2 --- SUM IS GREATER THAN ZERO             */    93
/*                     3 --- OVERFLOW                             */    94
/*                                                                */    95
/*   PIPELINE SEQUENCE:                                           */    96
/*       G B L E W                                                */    97
/*                                                                */    98
/*   INTERRUPTIONS: FIXED POINT OVERFLOW                          */    99
/*                                                                */    100
/*   FLOW: $1 → $2B → EXIT                                        */    101
/*                                                                */    102
/*   CONTROL-STORE REQUIREMENT:       ECSA = 0                    */    103
/*                                    ECSB = 1                    */    104
/*                                                                */    105
/*                                    TOTAL ECS = 1               */    106
/*                                                                */    107
/*   TIMING: 1 CYCLE                                              */    108
/*                                                                */    109
```

Page 4

```
                    /* AR, A -- 5A */                                      111
BEGIN AR;                                                               112
                                                                        113
CSECT LCS;                                                              114
                                                                        115
ORIGIN '5A'X;                                                           116
                                                                        117
```

TABLE 1-continued

```
EUA:    EUAR: $1:                                                           118
        OWRH → OWRSELH,                                                     119
        OWRL → OWRSELL,                                                     120
        OWRSELH → LUCKH,                                                    121
        OWRSELL → LUCKL,                                                    122
        LUCKH → AR,                                                         123
        LUCKL → BR,                                                         124
        K31TT & K32TT & K32CC | (LUCKH=0 & LUCKL=0) → CC0_TRIGGER,          125
        (K32TT & K31TT & LUCKH_SIGN & LUCKL_SIGN) |                         126
        (LUCKH_SIGN_XOR_LUCKL_SIGN &  K32TT) → CC1_TRIGGER,                 127
        K32TT_XOR_K31TT → CC3_TRIGGER,                                      128
        K32TT_XOR_K31TT → FPO_TRIGGER,                                      129
        1 → TEST_DATA_VALID,                                                130
        LLFC → LFCL,                                                        131
        ECSB → CONTROL_STORE,                                               132
        $2B → ECS_ADDR;                                                     133
                                                                            134
CSECT ECSB;                                                                 135
                                                                            136
$2B:    (AR/(0..31),0/(32..63)) → CPA2,                                     137
        0 → CPA1,                                                           138
        (BR/(0..31),0/(32..63)) → CPA3,                                     139
        CPA → RR,                                                           140
        LLFC → LFCL,                                                        141
        FPO_MASK & FPO_TRIGGER → FPO_INTERRUPT,                             142
        1 → BRANCH,                                                         143
        EXIT_LOOP_1A → BRANCH_ADDRESS;                                      144
                                                                            145
ENDB AR;                                                                    146
```

The first instruction in TABLE 1 is LOAD NEGATIVE (LNR). As shown on Page 1 of TABLE 1, the pipeline sequence is GBLEEW. Two E cycles are required. The two E cycles require two control words from the ECS store 33 in FIG. 3.

In Page 3 of TABLE 1, the ADD instruction is shown. The ADD instruction has the pipeline sequence GBLEW and only requires one control word from the ECS store 33.

When the LOAD NEGATIVE instruction is followed by the ADD instruction, and if there is no interlock other than that caused by LOAD NEGATIVE using two E cycles, then the pipeline sequences will align as shown in CHART 2.

CHART 2

| INSTRUCTION | Cycle | | | | | | |
|---|---|---|---|---|---|---|---|
| | 1 | 2 | 3 | 4 | 5 | 6 | 7 |
| LOAD NEGATIVE | G | B | L | E | E | W | |
| ADD | | G | B | B | L | E | W |

As is explained near the top of Page 1 of TABLE 2, the LOAD NEGATIVE (LNR) instruction forces a binary number to become negative. A negative number is not changed, but a positive number is altered so that it becomes negative with the same magnitude. The operand is loaded into register OWRH, which is the most significant half of register OWR 15. At the end of the second E cycle, the negative result is in RRH, which is the most significant half of register RR 16. The condition code is made zero if the result is zero; it is made one otherwise.

The microinstruction for the L cycle of LNR is shown in lines 42–52 of TABLE 1. The statements in lines 45–47 specify that the operand in OWRH is to pass through a hardware apparatus called LUCKH and then be loaded into register AR. The statements in lines 49 and 50 specify that the data be tested for zero and negative value, respectively. The statement in Line 48 specifies that this cycle is DATA VALID dependent, and will be repeated if the DATA VALID signal is not received. Lines 51 and 52 specify the location in ECS to be read for the first E cycle of LNR. All hardware used in this microinstruction belongs to the L facility.

Lines 56–67 contain the microinstruction for the first E cycle of LNR. Lines 56–60 load the complement of the operand into RRH. Lines 61–63 load the condition code based upon the test for zero that was done in the L cycle. Line 65 turns on the SEL LLFC. Line 66 tests whether the branch should be taken. The branch address is specified in line 67. The branch here is to an idle loop microinstruction (not shown) and indicates no further action is to be taken by the second E cycle. Lines 56–60 describe E facility activity, and lines 61–66 describe L facility activity.

Lines 69–76 contain the microinstruction for the second E cycle of LNR. Lines 69–73 cause the operand to be complemented again and then loaded into RRH. Line 74 causes SEL LLFC to be turned on. Lines 75 and 76 force a branch to the idle loop. Lines 69–73 describe E facility activity, and lines 74 and 75 describe L facility activity. Note that the only L facility activity specified in this microinstruction is to turn on SEL LLFC and select the idle loop address for BRAA. The designated L facility activity and the BRAA are selected only if CMD VALID is inactive.

The ADD instruction receives operands from OWRH and OWRL (OWRL is the least significant half of register OWR 15), adds them, places the sum in RRH, sets the condition code based upon whether the sum is zero, negative, positive, or overflowing, and causes an interrupt if the sum is overflowing and that type of interrupt is enabled.

The microinstruction for the L cycle of ADD is shown in lines 116–133. Lines 119–124 specify that the operand in OWRH is to pass through LUCKH and then be loaded into register AR and that the operand in OWRL is to pass through LUCKL and then be loaded into register BR. Lines 125–128 cause the condition code to be loaded. Line 129 causes an overflow prediction to be saved. Line 130 specifies that the DATA VALID signal is to be tested. Line 131 causes the SEL LLFC to be turned on. Lines 132 and 133 specify the location in ECS to be read for the E cycle of ADD. All hardware facilities used in this microinstruction are L facilities.

Lines 137–144 contain the microinstruction for the E cycle of ADD. Lines 137–140 cause the operands to be added and the sum to be loaded into RRH. Line 142 causes an interrupt if there is an overflow (predicted in the L cycle) and if the interrupt is enabled. Line 141 causes SEL LLFC to be turned on. Lines 143 and 144 force a branch to the idle loop. Lines 137–140 and line 142 specify E facility activity; lines 141 and 143 specify L facility activity. Again, the only L facility activity specified in this microinstruction is to turn on SEL LLFC and select the idle loop address for BRAA. The designated L facility activity and the BRAA are selected only if CMD VALID is inactive.

While the invention has been particularly shown and described with reference to preferred embodiments thereof, it will be understood by those skilled in the art that various changes in form and details may be made therein without departing from the spirit and the scope of the invention..

What is claimed is:

1. A data processing system having an instruction unit generating a sequence of execution unit commands and a means for supplying operands, comprising:

a first control store including a plurality of first storage locations addressed in response to execution unit commands for storing first microprogram control words in the storage locations and supplying the first microprogram control words from addressed locations, the first microprogram control words including a first facility control code field and a second stage command field;

a second control store including a plurality of second storage locations addressed in response to second stage addresses, for storing second microprogram control words in the second storage locations and supplying the second microprogram control words from addressed locations, the second microprogrammed control words including a first facility control code field, a second facility control code field and a branch field;

address selecting means, connected to receive the second stage command field and the branch field from addressed locations in the first control store and the second control store, for selecting the second stage command field or the branch field for supply as a second stage address in response to an address selector control signal;

code selecting means, connected to receive the first facility control code field from addressed locations in the first control store and the first facility control code field from addressed locations in the second control store, for selecting a first facility control code field from the first or second control stores for supply as a first facility control code in response to a code selector control signal;

first decoding means, connected to the code selector means, for decoding the first facility control code to generate first control signals and the address and code selector control signals;

second decoding means, connected to the second control store, for decoding the second facility control code field to generate second control signals; and execution means, connected to receive the operands, for executing the first and second control signals, the execution means including a first facility responsive to the first control signals and a second facility responsive to the second control signals connected in pipeline fashion whereby the first facility is adapted to execute first control signals for a given execution unit command in the same cycle that the second facility executes second control signals for a preceding execution unit command.

2. The data processing system of claim 1, wherein the means for supplying operands includes an operand word register; and the first facility is connected to receive operands from the operand word register, the second facility is connected to the first facility for receiving operands as processed by the first facility, and the second facility supplies resulting data in a result register; and further including clock control means connected to the first facility, second facility and result register for controlling the timing of execution in pipeline fashion.

3. The data processing system of claim 1 wherein the instruction unit generates a command-valid signal in association with each valid command in the sequence of execution unit commands, and wherein;

the address selecting means and the code selecting means are further responsive to the command-valid signal such that the address selecting means selects the second stage command field when the address selector control signal and the command-valid signal are asserted; and selects the branch field when the address selector control signal is asserted and the command-valid signal is not asserted, or when the address selector control signal is not asserted; and the code selecting means selects the first facility control code field from the first control store when the code selector control signal is asserted and the command-valid signal is asserted; and selects the first facility control code field from the second control store when the code selector control signal is asserted and the command-valid signal is not asserted, or when the code selector control signal is not asserted.

4. The data processing system of claim 1 wherein the first control signals include a test data valid signal and the means for supplying operands generates a data valid signal when valid data is available, and further including clock control means, responsive to the test data valid signal and data valid signal for delaying execution by the execution means in response to a test data valid signal until a data valid signal is received.

5. The data processing system of claim 3 wherein the first control signals further include a result register clock signal and the second facility includes a result register for supplying resulting operands wherein said clock control means includes means for enabling the loading of the result register while execution is delayed pending receipt of a data valid signal.

* * * * *